W. CASE.
Coal-Mining Machines.

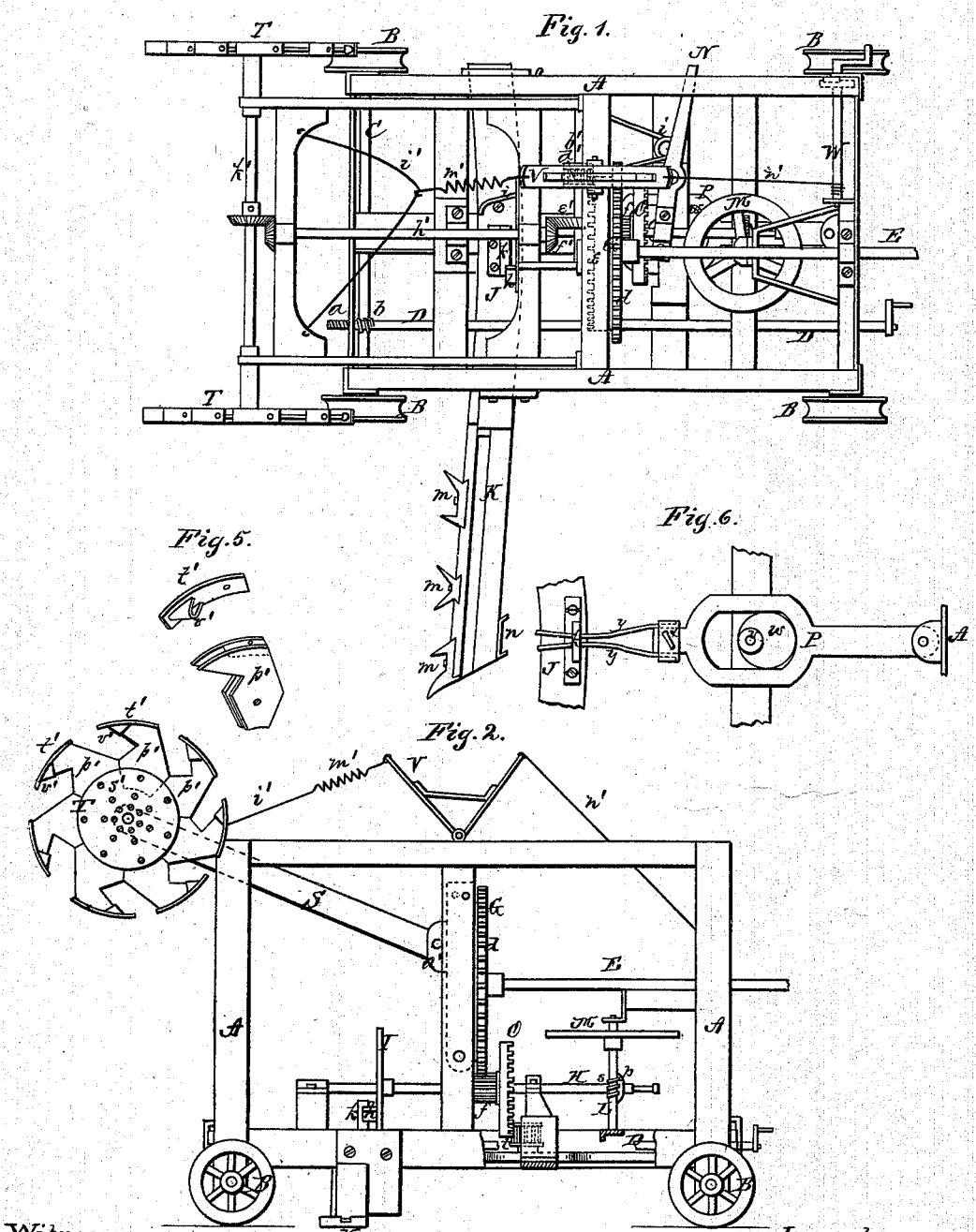

No. 139,541.

2 Sheets--Sheet 2.

Patented June 3, 1873.

UNITED STATES PATENT OFFICE.

WARREN CASE, OF TROY, ILLINOIS.

IMPROVEMENT IN COAL-MINING MACHINES.

Specification forming part of Letters Patent No. 139,541, dated June 3, 1873; application filed April 30, 1873.

*To all whom it may concern:*

Be it known that I, WARREN CASE, of Troy, in the county of Madison and State of Illinois, have invented certain new and useful Improvements in Machines for Mining Coal; and I do hereby declare the following to be a full, clear, and exact description of the invention, such as will enable others skilled in the art to which it pertains to make and use it, reference being had to the accompanying drawings, which form part of this specification:

The nature of my invention consists in the construction and arrangement of a machine for mining coal, as will be hereinafter more fully set forth.

Figure 3:
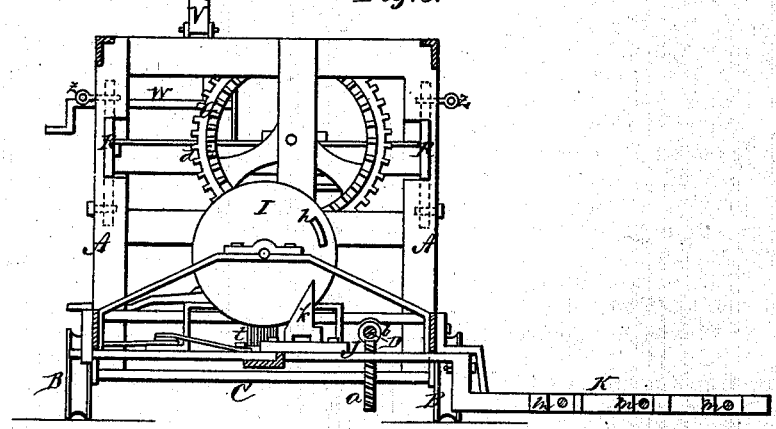
Figure 4:
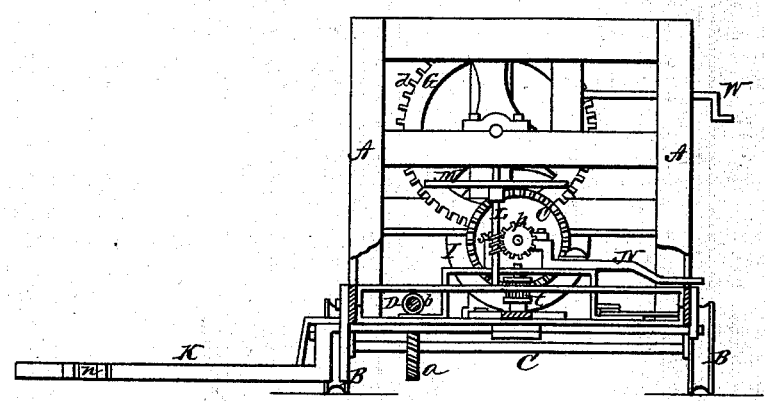

In the accompanying drawings, Figure 1 is a plan view; Fig. 2, a side elevation, and Figs. 3 and 4 end views, of my entire machine. Figs. 5 and 6 are views of detached parts of the same.

Like letters indicate corresponding parts.

A represents the frame of my machine, which is mounted upon four wheels, B B, and to be run on a suitable track in the mine. C C are the two axles, upon each of which is a cog-wheel, $a$, which gears with a worm, $b$, upon a shaft, D, running longitudinally in the frame A. This shaft D may be turned by a crank by hand to feed the machine along, or it may be connected by suitable gearing with the working mechanism so as to feed the machine automatically. E represents the main driving-shaft turned by any suitable power, and running longitudinally in the frame A. On the inner end of this shaft is a large wheel, G, having cogs both around the circumference and on the outer side, the former being marked $d$ and the latter $e$. The cogs $d$ of the wheel G gear with an elongated pinion, $f$, upon a shaft, H, running below and parallel with the main shaft E. On this shaft H is a disk or wheel I provided on its face with a tooth or projection, $h$, which, as the wheel revolves, strikes a post, $k$, on an arm, J, to which the saw K is attached, and draws the same backward, and as soon as said tooth or projection $h$ has cleared the post $k$, a spring, $i$, properly arranged, throws the saw forward again. The saw-arm J is slightly curved, as shown in Fig. 1, and the saw K is straight. The saw-arm moves in guides in the frame, and being curved, gives the saw such a motion that only one point of each of the double-pointed teeth $m$ $m$ of the saw will work at every stroke; or, in other words, one point of each tooth will work at the forward and the other at the backward stroke. The teeth are inserted by dovetails and fastened by screws as shown, and can readily be removed for sharpening or for replacing by others when broken without removing the whole saw from the machine. On the back of the saw K are attached clearers $n$ $n$ for removing the dust and chips out of the passage or saw-cut. On the shaft H is a pinion, $p$, which gears with a worm, $s$, on an upright shaft, L, and upon this shaft is attached the fly-wheel M.

By thus placing the fly-wheel upon a separate shaft at right angles with the driving-shafts, the fly-wheel is made to revolve at a materially increased speed from that of the working parts, and hence exerts far more power than it could possibly do if located upon one of said driving-shafts.

In mining coal the miners often meet coals of different hardness, some stratums being hard and others more or less soft; and hence it is necessary to change the speed of the saw. To do this without changing the speed of the machine, I employ the following device: The shaft H is movable endwise in its bearings, and is shifted by means of a lever, N. On the shaft is a cog-wheel, O, having its cogs on the side, which, when the lever N is thrown to one side, gears with a pinion, $t$, on a short vertical shaft, $v$, and this shaft carries an eccentric, $w$. This eccentric operates in a slotted lever, P, pivoted at one end to the frame A, and vibrates the same rapidly. On the loose end of the lever P is attached a box, $x$, with two spring-arms $y$ $y$ projecting from the same, which arms are inserted in a slot on the post $k$ of the saw-arm J. When this device is used the spring $i$ should be disconnected from the saw. By moving the lever N the shaft H is moved so as to throw the cog-wheel O out of gear with the pinion $t$, and also the wheel I, in such a position that its projection $h$ will again operate on the post $k$. The operator can thus almost instantaneously change the speed of the saw to suit the kind of coal through which it is passing without changing the speed of the driving-shaft.

When the eccentric movement is in operation the fly-wheel is thrown out of gear by the movement of the shaft H. In the frame A on each side and on a line with the large cog-wheel G is a bar, R, pivoted to the frame at its lower end and held at the upper end by a pin, $z$. On the front side of each bar R is a projection, $a'$, and to and between these two projections $a'$ is pivoted a frame, S, one of the pivots being a shaft, $b'$, upon which is a pinion, $d'$, to gear with the cogs $e$ of the wheel G. By changing the position of the bars R R by means of the pins $z\ z$, this pinion $d'$ is thrown in and out of gear with the wheel G. On the shaft $b'$ is a miter-wheel, $e'$, meshing with a similar wheel, $f$, on a shaft, $h'$, running longitudinally through the frame S. In the outer end of this frame is a horizontal shaft, $k'$, connected with the shaft $h'$ by means of the miter-wheels and carrying at each end a circular saw T. The saws T T are to be made adjustable on the shaft $k'$, so that the distance between them may be regulated at will. They are used to cut down the sides of the mine, and a bail, $i'$, at the outer end of the frame S is by a spiral-spring, $m'$, connected with an elbow-lever, V, pivoted or hinged on top of the main frame, and the other end of said lever by a cord or chain, $n'$, connected with a windlass, W, so that while the saws are working they can easily be raised and lowered as desired. The saws T T are constructed as shown in Figs. 2 and 5, each saw consisting of a series of double-teeth, $p'$, fastened between two disks $s'$, and each tooth provided with a shoe, $t'$, which forms the cutter. The shoe $t$ is provided with a socket, $v'$, into which the point of the tooth is inserted, and the shoe then fastened by a screw through the other end. By this means any single part of the saw that should need repairing or exchanging can readily be taken off without the trouble of removing the whole saw. A spring should also be arranged back of each tooth to give a slightly-yielding cut and prevent breakage.

Having thus fully described my invention, what I claim as new and desire to secure by Letters Patent, is—

1. In combination with the saw K, clearers $n$, attached to the back of the saw for the purposes herein set forth.

2. The combination of the shaft E, cog-wheel G $d$, elongated pinion $f$, movable shaft H, wheel I with projection $h$, post $k$, and spring $i$, all constructed and arranged substantially as and for the purposes herein set forth.

3. The combination with the shaft E, cog-wheel G $d$, elongated pinion $f$, and movable shaft H, of the gears O $t$, shaft $v$, eccentric $w$, lever P with box $x$, spring-arms $y\ y$, and post $k$, all constructed and arranged substantially as and for the purposes herein set forth.

4. The fly-wheel M arranged upon an independent shaft, L, standing at right angles with the driving-shaft H, and connected with it by the worm $s$, and pinion $p$, substantially as and for the purposes herein set forth.

5. The combination of the swinging-frame S, carrying the saws T T, the bail $i'$, spring $m'$, elbow-lever V, cord or chain $n'$, and windlass W, all substantially as and for the purposes herein set forth.

6. The saw T, constructed as described of the disks $s'$, teeth $p'$, and shoes $t'$, all substantially as herein set forth.

In testimony that I claim the foregoing, I have hereunto set my hand this 14th day of April, 1873.

WARREN CASE.

Witnesses:
E. H. WELLS,
EDM. F. BROWN.